J. PAHUD AND J. HUGUENIN.
SELF CONTROLLING APPARATUS FOR STAMPING TICKETS.
APPLICATION FILED APR. 29, 1919.
1,368,831.
Patented Feb. 15, 1921.
7 SHEETS—SHEET 1.
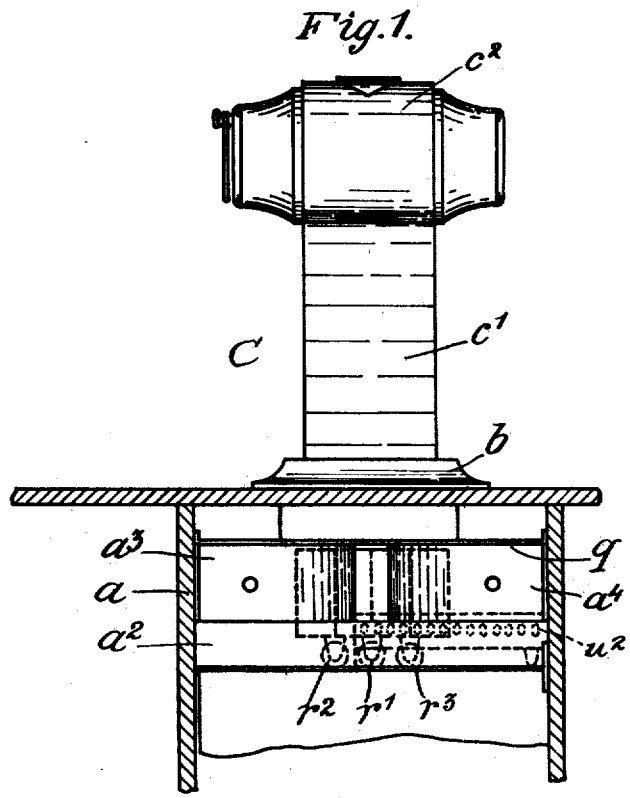
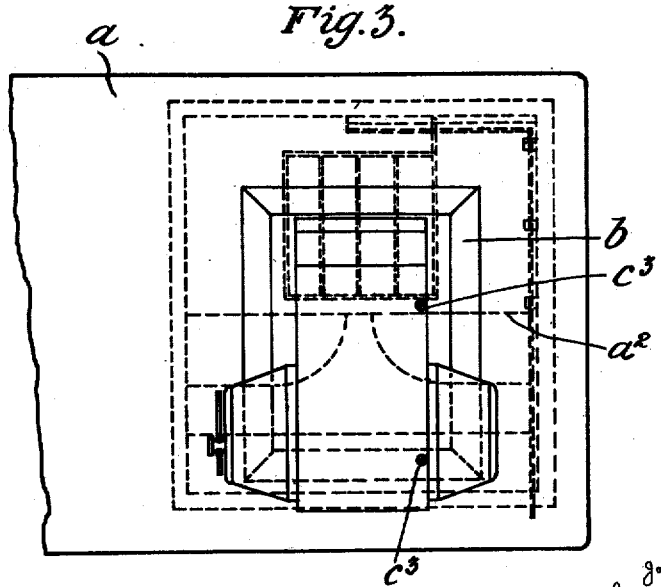

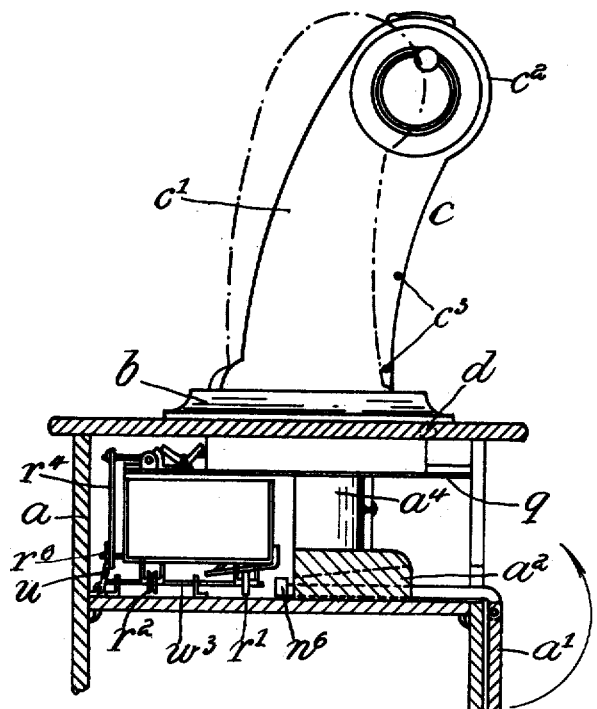
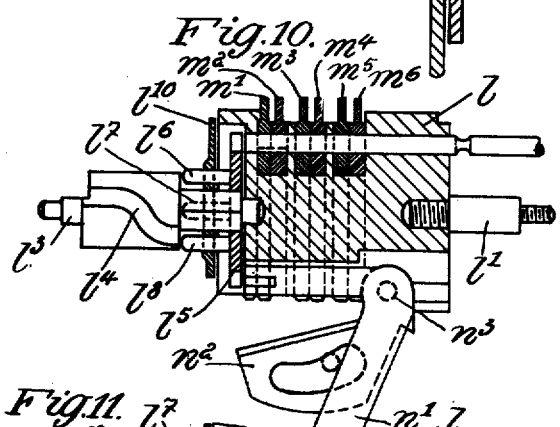
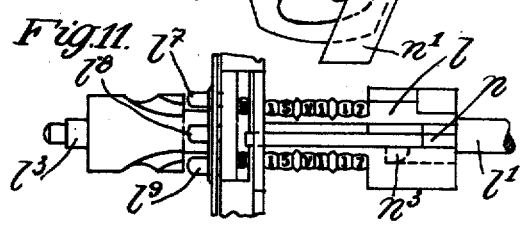

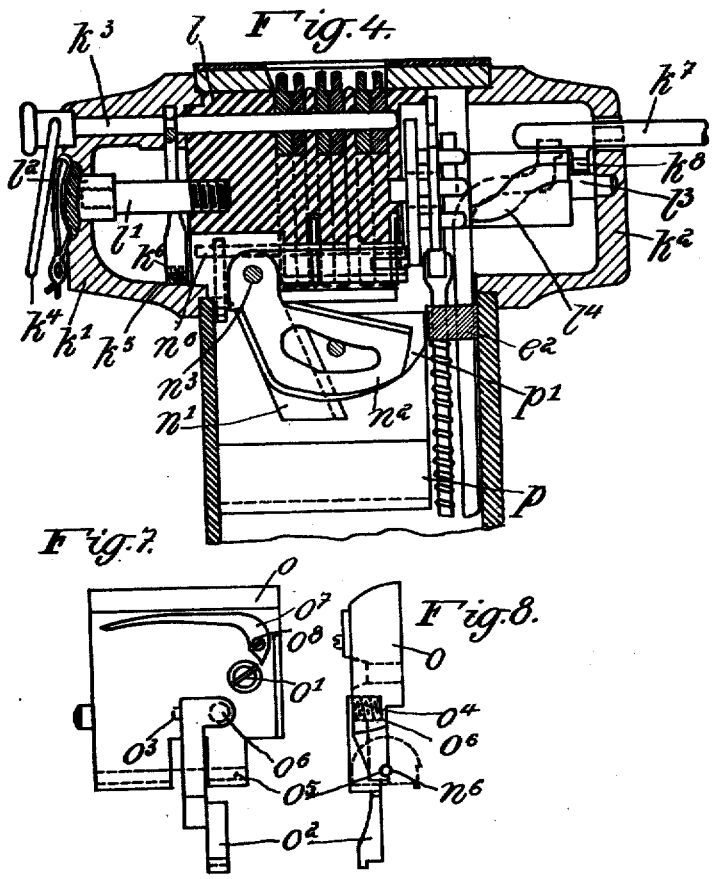

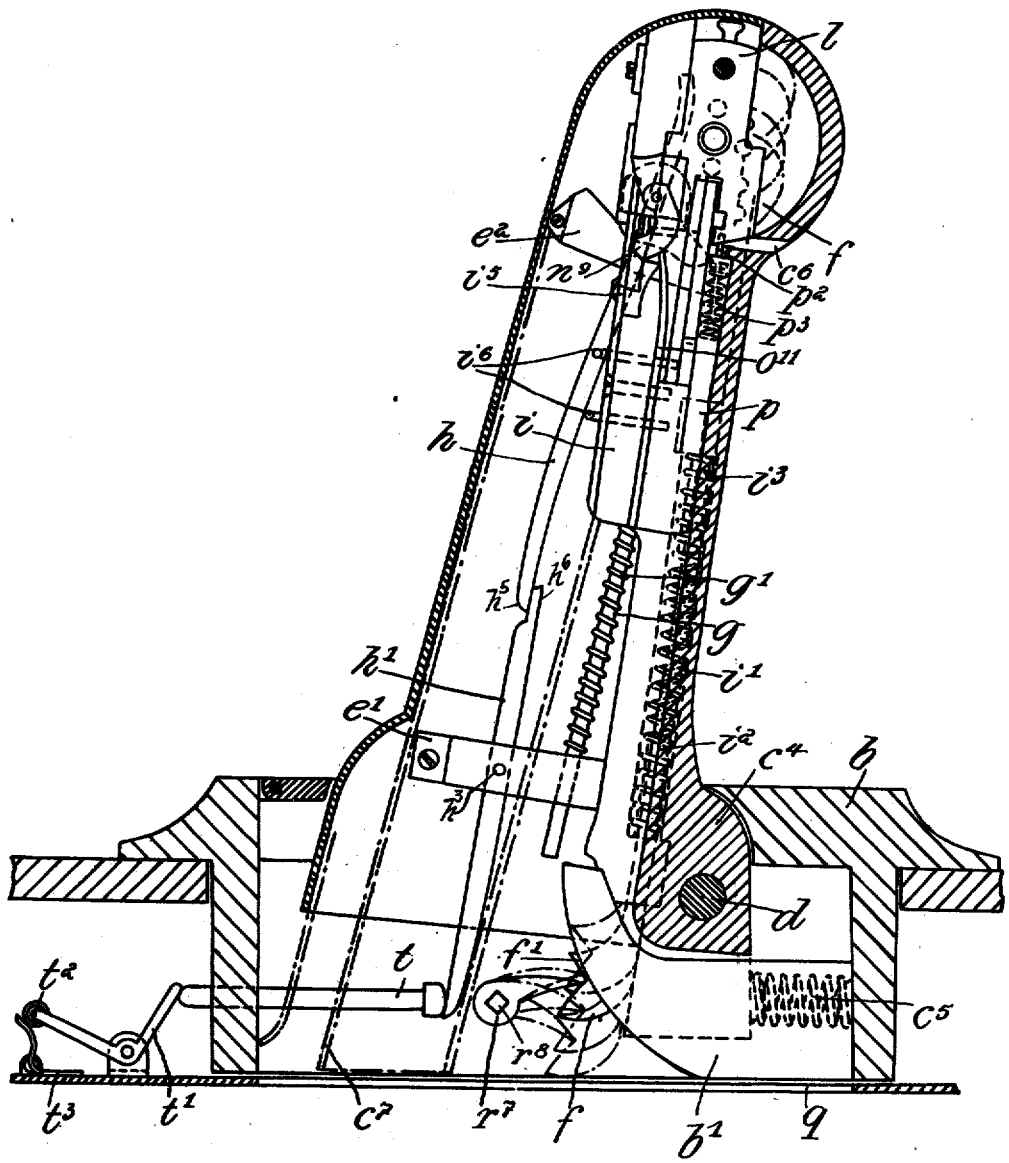

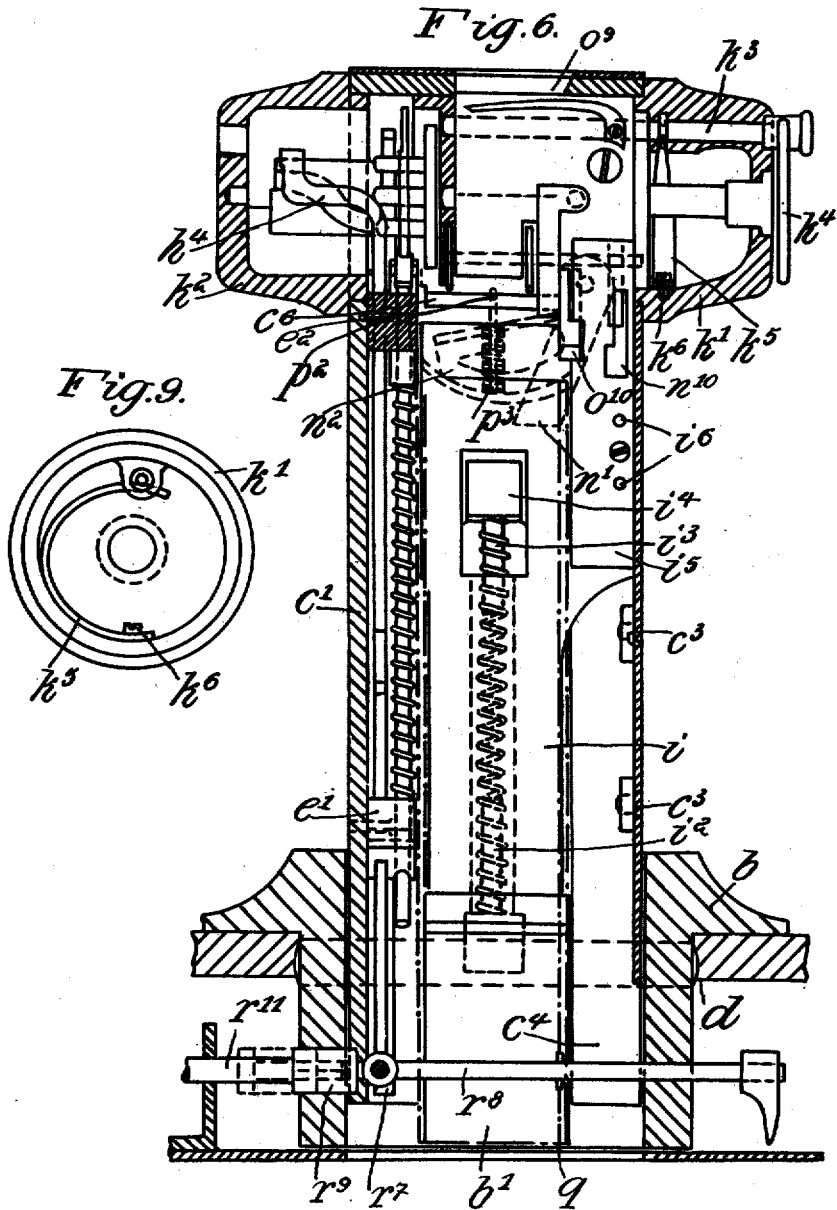

J. PAHUD AND J. HUGUENIN.
SELF CONTROLLING APPARATUS FOR STAMPING TICKETS.
APPLICATION FILED APR. 29, 1919.
1,368,831.
Patented Feb. 15, 1921.
7 SHEETS—SHEET 6.
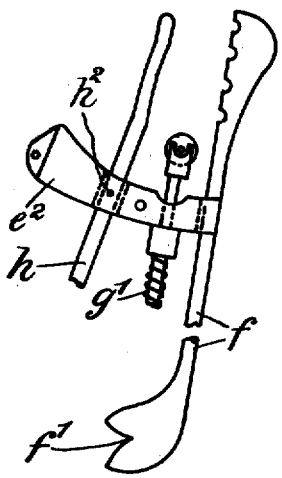
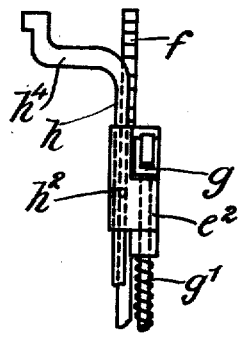
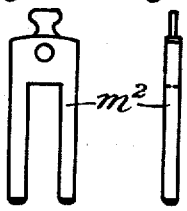
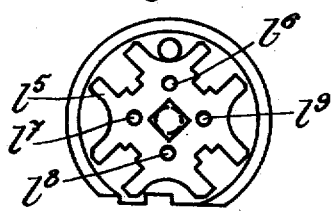
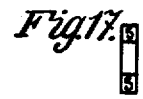
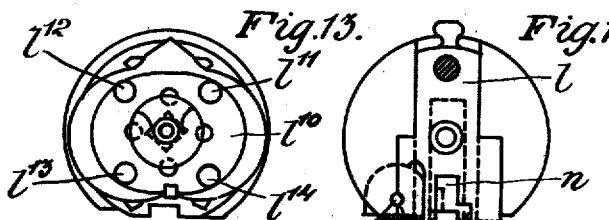
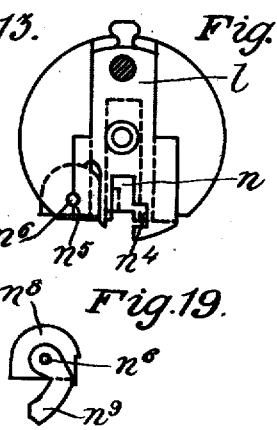
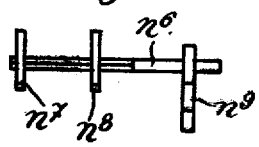

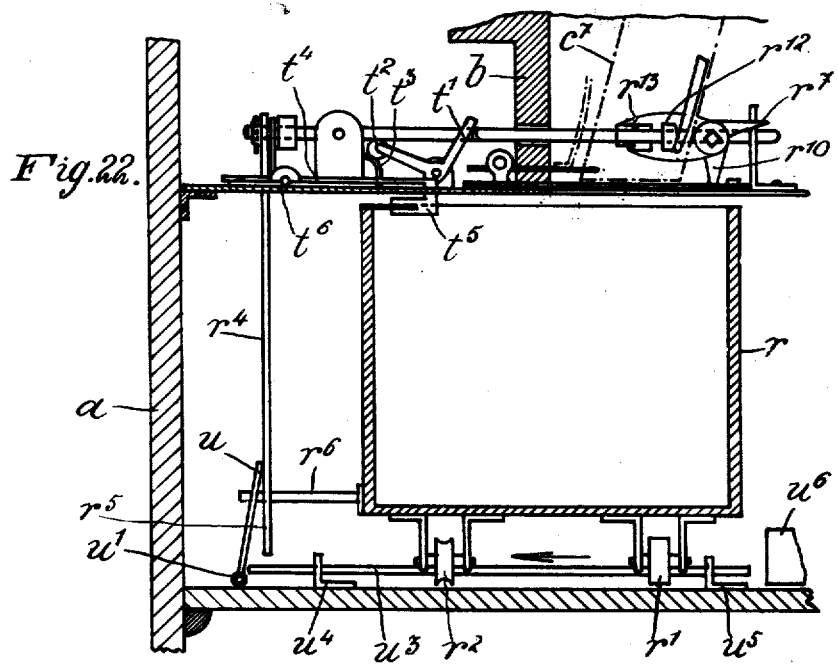

UNITED STATES PATENT OFFICE.

JOHN PAHUD AND JACQUES HUGUENIN, OF LAUSANNE, SWITZERLAND.

SELF-CONTROLLING APPARATUS FOR STAMPING TICKETS.

1,368,831.          Specification of Letters Patent.      Patented Feb. 15, 1921.

Application filed April 29, 1919. Serial No. 293,566.

*To all whom it may concern:*

Be it known that we, JOHN PAHUD, engineer, and JACQUES HUGUENIN, merchant, citizens of Switzerland, residing at Lausanne, canton of Vaud, in the Confederation of Switzerland, have invented certain new and useful Improvements in and Relating to Self-Controlling Apparatus for Stamping Tickets, of which the following is a specification.

The object of the present invention is the provision of a self-controlled apparatus for stamping tickets. This apparatus comprises a hollow body mounted on a pedestal and adapted to oscillate on a stationary axle. Inside of this body are arranged a number of printing devices which will make various impressions on the tickets while the body is caused to oscillate, said printing devices being in duplicate with a view of stamping the same mark (as for instance a date) simultaneously on a part of the ticket which is to be delivered and on a part which is to be detached therefrom and retained by the apparatus as a record of its operation. The apparatus also comprises a countermarking device imprinting on the ticket and on its stub a counter-mark brought into position by means of a key inserted by the operator and so that the counter mark will not be printed on the tickets and on the stubs unless said tickets are delivered by the same operator who possesses the key.

The annexed drawing represents as an example one working form of the apparatus devised for the stamping of railroad tickets, said apparatus being combined with counters not shown in the drawing.

Figure 1 is a partial section and front elevation.

Fig. 2 is a side elevation partly in section.

Fig. 3 is a partial plan.

Fig. 4 is a longitudinal section of the head of the hollow body.

Fig. 5 is a section of this hollow body mounted on its pedestal and showing the arrangement of the various parts thereof; this section being at right angles to that seen in Fig. 4.

Fig. 6 is a longitudinal section of the hollow body seen from back to the front.

Fig. 7 is a side elevation of the stop member and parts associated therewith for determining the position of the tickets when inserted in the machine.

Fig. 8 is an edge view of the same.

Fig. 9 is a plan of the spring member employed to maintain in position the pin by which the stamping plates are secured in the apparatus.

Fig. 10 is a sectional elevation, illustrating the stamping plates and the block in which they are placed together with the parts associated therewith.

Fig. 11 is a plan view of the same.

Fig. 12 is a plan of the counter marking plate.

Fig. 13 is a plan of the cam member and parts connected therewith which are associated with the counter marking plate.

Fig. 14 is an end elevation of the parts as shown in Fig. 10, showing the dating plates and the block in which they are placed.

Fig. 15 is a front elevation of one of the dating plates.

Fig. 16 is an edge elevation of the same.

Fig. 17 is a plan of the end of the same.

Fig. 18 is a side elevation illustrating the gripper or extracting device.

Fig. 19 is an end elevation of the same.

Fig. 20 is a front elevation of the levers by which the carriage operating mechanism is actuated, and Fig. 21 is an edge elevation of the same.

The Figs. 22 and 23 represent diagrammatically in a vertical section and in a plan the parts for operating the pigeon holes into which the stocks of the tickets after their stamping will be dropped and the parts, which in the example shown, are combined with the counters, not shown in the drawing, and which assure the operation of the same.

The apparatus as illustrated is placed on a support $a$, as a table for instance, in which is disposed, on a base $b$, a hollow body $c$, which can oscillate around on a fixed axis $d$, carried by the base $b$. The hollow body $c$ which is formed with a shank $c^1$ of rectangular section and a head $c^2$, is divided in two pieces which form the two faces of the shank and one of which may be made for instance of a thin sheet of metal and may be fixed to the other by means of screws $c^3$. One of the two pieces has a reinforced part $c^4$ through which passes the axis $d$ and adjacent the back of which are two springs, only one of which, $c^5$, is seen in the drawing. Both springs, however, are set with one extremity against the part $c^4$ and the other of their extremities against the inner wall of the base $b$, in order to return the hollow body $c$ to position after each operation of the apparatus. There is also shown at the lower part of the head an aperture $c^6$ for the introduction of the ticket. In the shank $c^1$ of this hollow body, carried in a lateral face and maintained by two bridges $e^1$ and $e^2$, there is a toothed rack $f$ (Figs. 20 and 21) the lower end of which is enlarged and provided with a notch $f^1$; there is also a rod carrying a roller $g$, provided with a spiral spring $g^1$ and working like a pusher on a disk which is hereinafter described. There are also two levers $h$ and $h^1$, which are pivoted to oscillate on the points $h^2$, $h^3$, and the lever $h$ is provided at its upper or outer end with a cranked part $h^4$ and contacts at its lower end $h^5$ with the upper end $h^6$ of the lever $h^1$. The utility and the functions of these different parts are hereinafter described. On the frontal face there is a sliding bar $i$ which rests on a nose $b^1$ of the base $b$. This sliding bar is provided with a spring $i^1$ extending between two fingers $i^2$ and $i^3$, the finger $i^2$ being connected to the sliding bar itself and the other finger $i^3$ connected to a nose $i^4$ made integral with the shank $c^1$. The spiral spring $i^1$ is lodged in a cavity made partly in the sliding bar and partly in the median face of the shank. The head $c^2$ of the hollow body comprises two cup like face ends $k^1$, $k^2$ secured thereon and in the face end $k^1$ is fitted a pin $k^3$ with a ring handle $k^4$ for fixing the dating plates as will be explained hereinafter. A circular spring $k^5$ (Fig. 9) fixed to the inside of the face end $k^1$ by means of a screw $k^6$ secures the pin $k^3$ in its position. The other face end $k^2$ is provided with a hole into which are inserted the keys of usual shape each presenting a shank $k^7$ and a nose $k^8$ (Fig. 4). A flattened block $l$ (Figs. 10 and 11) is located within the head $c^2$ between the two face ends $k^1$ and $k^2$ and is held within the face end $k^1$ by means of an axle $l^1$ and a threaded sleeve $l^2$ which is adapted to be secured to the face end $k^1$ by a suitable seal (Fig. 4), so as to make any illicit dismounting of the apparatus at once apparent. At the opposite end of the block $l$ an axle $l^3$ is secured in the same and provided with helical grooves $l^4$. This is journaled at its other end in the face end $k^2$ so as to be turned by the effect of one of said keys as will be explained further on. This axle $l^3$ is also provided with a squared part on which is fitted a countermarking plate $l^5$ (Figs. 10 and 12) having bosses $l^6$, $l^7$, $l^8$ and $l^9$ which engage with the rack $f$. On the axle $l^3$ there is also an inverted heart plate $l^{10}$ (Fig. 13) against which is guided the roller of the pusher rod $g$ and which plate is provided with four holes $l^{11}$, $l^{12}$, $l^{13}$ and $l^{14}$ for a purpose as will be explained further on. The block $l$ is also provided with spaces in which various dating plates $m^1$, $m^2$, $m^3$, $m^4$, $m^5$ and $m^6$ are kept in position by the pin $k^3$ and of which the one designated $m^2$ is represented in the drawing, Figs. 15 to 17. These dating plates constituting a complete series, make it possible to mark the exact date when the apparatus has been used and are shaped so as to engage in the block $l$ each being provided with a hand knob, and at the end faces of the legs of which the characters are cut in relief. This block $l$ is also provided on this side with a recess for the countermarking plate $l^5$ shown in a front view in Fig. 12. This plate is mounted on the squared part of the axle $l^3$ turns with said axle, and has arms in pairs and at the face ends of each of these pairs there is cut the same counter mark in relief, the purpose of which will be explained hereinafter.

A slide bar $n$ is provided at the lower part of the block $l$. The slide bar has an elbowed support $n^1$ for a shears $n^2$, which can oscillate, when the apparatus is operated. Over a spindle $n^3$ (Figs. 4 and 10) placed in a guide $n^4$ in the block $l$ (Fig. 14) and on the external face of the block $l$ there is provided a half cylindrical notch $n^5$ in which is disposed an axle $n^6$, cylindrical for a part of its length and square for the other part. This axle is part of an extractor which is formed with two half disks $n^7$, $n^8$ each provided with a nose and placed parallel to each other on the square end of the axle $n^6$, and also provided with a ratchet $n^9$, mounted on the cylindrical part thereof. The function of the extractor will be explained further on. A block $o$ (Figs. 7 and 8) secured by means of a screw $o^1$ on the block $l$ maintains the same with the two cup like face ends $k^1$, $k^2$ together. The block $o$ is provided with a half cylindrical notch $o^5$ corresponding with the notch $n^5$ and is used for carrying the axle $n^6$ of the extractor, as well as a buffer $o^2$ which is intended to prevent the movements of the sliding bar $i$ before the introduction of a ticket in the apparatus and which may oscillate on a pin $o^3$ and be held in position by means of a spiral spring $o^4$ disposed behind the buffer in a recess $o^6$ provided in the block $o$. A spring $o^7$ fixed by means of a screw $o^8$ on the block $o$ is adapted to carry a cover (not shown in the drawing) which will shut an aperture $o^9$ (Fig. 6) by which the dating plates are introduced in the block $l$.

The sliding bar $i$ is provided with a sheet $i^5$ (Fig. 6) fixed thereto by means of pins $i^9$ and in which are provided inclines $n^{10}$ for the passage of the ratchet $n^9$ of the extractor, and $o^{10}$ for the passage of the buffer $o^2$. The extractor ratchet $n^9$ is moved when the apparatus is in action, by means of a double spring $o^{11}$ mounted on the sliding bar, which is provided moreover with a plate $p$ (Figs. 4 and 5) of a rectangular shape from which the lower part is beveled off, for its mounting over the sliding bar, said plate being provided with a guide $p^1$ over which slides the lower part of the shears $n^2$ when the apparatus is operated in order to actuate the shears. A closure for the opening $c^6$, formed in this case by a cylindrical rod $p^2$ is lodged in the plate $p$ (Fig. 5), this rod $p^2$ being provided with an abutment and a spiral spring $p^3$ preventing the introduction of a second ticket before the apparatus returns to its initial position.

A channel $c^7$, made for instance with thin sheets shown in Fig. 5 in broken lines, is mounted in the shank $c^1$, against the sliding bar $i$ and is intended to lead the cut-off controlling stubs of the tickets stamped by the apparatus into a pigeon hole which is disposed at the lower part of the apparatus.

As illustrated, the said pigeon hole comprises a carriage $r$ (Fig. 22) divided in four pigeon holes and disposed under a plate $q$, which carriage has its wheels $r^1$, $r^2$ and $r^3$ mounted on two rails. One of the wheels $r^1$ is plain and the other wheels $r^2$ and $r^3$ are each provided with a circular groove. The carriage is actuated by means of a lever $r^4$ provided at its free extremity with an elongated aperture $r^5$ in which is placed a rod $r^6$ fixed on the carriage. The lever is actuated by means of a nose $r^7$ (Fig. 5) moved by the lower extremity of the rack $f$ which is provided for this purpose with the notch $f^1$ mentioned hereinbefore and in which is lodged the finger extremity of the nose $r^7$. This nose $r^7$ is secured on a shaft $r^8$ provided at one of its extremities with a sleeve $r^9$ and at the other extremity with a second finger $r^{10}$. The sleeve $r^9$ is coupled to a square shaft $r^{11}$ provided at one of its extremities with an arm $r^{12}$ having a notch $r^{13}$ in which is engaged a finger $r^{14}$ mounted on a shaft $r^{15}$ at one end of which is connected the lever $r^4$, which operates the carriage. The shaft $r^{15}$ is provided at its extremity, where it is connected to the lever $r^4$, with a double arm $r^{16}$ on the two ends of which two springs $r^{17}$, $r^{18}$ act, these two ends being provided with notches, in which the said springs enter (Fig. 23). The function of these springs is to return the lever $r^4$ to its initial position. A finger $r^{19}$, the extremity of which is recessed, is disposed on the same shaft $r^{15}$. In this recess is engaged a friction roller $r^{20}$, mounted at the extremity of a rod $r^{21}$ maintained in position on two brackets $r^{22}$, $r^{23}$ and provided with a spiral spring $r^{24}$ pressing the friction roller $r^{20}$ against the finger $r^{19}$. The object of this is to return the lever $r^4$ and therefore also the carriage $r$ into their initial positions in which they are shown in Fig. 23.

The finger $r^{10}$, mounted on the shaft $r^8$ operates an elbow lever $s$ one of the arms of which is provided with a notch in which is engaged the finger $r^{10}$. This elbow lever oscillates on a spindle $s^1$ and is returned by a flat spring $s^2$ provided at one of its extremities with a fork $s^3$ and fixed at its other extremity on a support 1 connected to the plate $q$. The elbow lever $s$ is provided on its other arm with a sleeve 2, in which is mounted a rod 3 fixed at one of the extremities of the winged rod $s^4$. This elbow lever $s$, when the apparatus is actuated will operate this winged rod $s^4$ which is provided with three fingers $s^5$, $s^6$ and $s^7$ for operating on counters, which are not represented in the drawing. The finger $s^6$, is broader than the two others and operates in this example the two middle counters. The cover of shank $c^1$ is provided at its lower part with an elbow lever $c^6$ working on a wing $s^9$ disposed on the winged rod $s^4$ and sets this in motion, as will be explained afterward. The winged rod $s^4$ is provided at one of its extremities with a finger $s^{10}$, over which operates a rod $s^{11}$ provided with a spiral spring $s^{12}$ (Fig. 23) used when mounting the apparatus.

The highest extremity of the elbow part $h^4$ of the lever $h$ is formed in such a manner that it may be placed in the path of the nose $k^8$ or the key $k^7$. At the time of the introduction of the last one in the head of the machine at the time of starting the apparatus, the nose $k^8$ displaces this elbow part $h^4$, so that the lever $h$, oscillating on the point $h^2$, presses its extremity $h^5$ on the extremity $h^6$ of the lever $h^1$. The lower extremity of the lever $h^1$ then acts on a pusher $t$ (Fig. 5) mounted in the base $b$ of the apparatus and one of the extremities of which acts upon an elbow lever $t^1$, provided with a roller $t^2$ which presses over a rocker lever $t^3$ that moves a stop lever $t^4$ of the carriage $r$ (Figs. 22 and 23), and this stop lever is provided with a nose $t^5$ which turns on a spindle $t^6$. The stop lever $t^4$ is returned to position by springs $t^7$. The nose $t^5$ of the said stop lever $t^4$ can engage with one or the other of the notches $t^8$ of a plate $t^9$ fixed at the upper part of the carriage $r$ to retain the carriage in a predetermined position.

A locking plate $u$ (Fig. 2) of the carriage $r$, hinged at $u^1$, is located at the inner side of the part $a$. This plate is provided with vertically elongated openings $u^2$ (Fig. 1) and normally inclines toward the carriage, so that the rod $r^6$, fixed at the carriage, passes through one of the openings $u^2$ of the locking plate $u$ to fix the carriage $r$. A rod $u^3$ mounted on two supports $u^4$, $u^5$ disposed at the inner side of the part $a$, is set in motion by a buffer $u^6$ which is fixed on the door $a^1$ of the part $a$ and, when the said door is closed, will bear against the locking plate and push the same against the wall of the part $a$ in the direction indicated by the arrow in Fig. 22, thus disengaging the rod $r^6$ and allowing the carriage $r$ to effect the movements which are imparted to it by the lever $r^4$ when brought in action, as seen before and by the movement of the rack $f$.

When the apparatus is mounted on the support $a$, as shown in Figs. 1 and 3 of the drawing, a block $a^2$ will be located inside of said support $a$ in front of the carriage $r$. This block may be solid and two vertical shutters $a^3$, $a^4$ are fixed thereon and cover partially, as is shown in Fig. 1, the space occupied by the carriage $r$ and when the door $a^1$ is opened will not permit any hand being introduced into this space. This block $a^2$ and the shutters $a^3$, $a^4$ may be parallel with the walls of the part $a$; this is not shown in the drawing but will make it possible to prevent any illicit dismounting of the apparatus. The plate $q$ under which is disposed the carriage $r$ can be fixed on the part $a$ by means of screws which are not shown on the drawing.

The apparatus as illustrated is adapted to be operated by four persons and works as follows:

The dating plates $m^1$ to $m^6$ being placed within the spaces provided therefor in the block $l$ and the devices for preventing any fraudulent operation, as well of the head as of the carriage, being set, the person superintending the apparatus, after having shut door $a^1$ of the support $a$ of the apparatus, which releases the locking plate $u$ from its engagement with the rod $r^6$ of carriage $r$ hands one of the four keys to each of the persons in charge of the apparatus for stamping tickets such as railway tickets for instance. The said keys are numbered from one to four, and the countermarking plate $l^5$ is numbered in the same way at the ends of its bosses. Before introducing one of the keys in the apparatus, the various parts in the head are in the position in which they are shown in Figs. 10 and 13, that is they are in a position of rest, in which position the shank $c^1$ of the apparatus is inclined as shown in full lines in Fig. 2, and the carriage $r$ is in the position represented in Fig. 3.

The operator who is to operate the first distribution of tickets and who is in possession of the key number two, for instance, will introduce his key $k^7$ in the opening provided (Fig. 4) in the cup like face end $k^2$ of the head $c^2$ of the hollow body, in which opening the rod of said key can only be axially displaced. The key is provided, as mentioned before, with a projection $k^3$, which is of a well determined form and which engages in the aperture of one of the two helical grooves $l^4$, provided on the axle $l^3$. The two lateral edges of either of the two grooves present a determined profile of their own and are each adapted to its own key. During the movement of the key $k^7$, from the beginning to the end of the groove belonging to said key, the projection $k^3$ will turn with the axle $l^3$ at a given angle. The axle $l^3$ while turning will also turn the countermarking disk $l^5$ and heart plate $l^{10}$ and the end of key $k^7$ will engage in one of the holes of the heart plate $l^{10}$ and the bosses $l^6$ to $l^9$ will move the rack $f$. This movement will be transmitted by means of the finger $r^7$ to the shaft $r^8$, the sleeve $r^9$ of which is engaged on the squared part of the shaft $r^{11}$. The arm $r^{12}$ on this shaft transmits the rotary movement to the finger $r^{14}$, which turns the shaft $r^{15}$ and finally the moving lever $r^4$ through a given angle, so as to push the carriage $r$ with its pigeon hole No. 2 under the canal $c^7$. Simultaneously with these movements the key will also displace the lever $h$ which with the upper end of its bent part $h^4$ projects into the path of the projection $k^3$ of the key. The lever $h$ therefore while turning on the pin $h^2$ in the given direction will transmit this movement to the lever $h^1$, which moves the pusher $t$. This pusher is provided within the base plate $b$ (Fig. 5) and the end of the lever $h^1$ operating the angular lever $t^1$ will by means of the rocker lever $t^3$ cause the stopping lever $t^4$ to rise. The nose $t^5$ of this stopping lever $t^4$ will therefore be disengaged from the notch $t^8$ of the plate $t^9$ attached to the upper part of the carriage $r$, and liberating this carriage will permit it to follow the impulses imparted to it by the driving lever $r^4$. As the effect of the projection $k^3$ of the key on the end of the bent off part $h^4$ of the lever $h$ is only a momentary one, owing to the short length of this end, the pusher $t$ releases rather quickly the angular lever $t^1$ and the rocker lever $t^3$ so that the nose $t^5$ of the stopping lever $t^4$ which is brought back by its springs $t^7$ will engage into the notch $t^8$ of the plate $t^9$ located above the pigeon hole 2 of the carriage $r$ and will keep the carriage in this position until the removal of the key $k^7$ from the head of the apparatus. The complete sliding movement of the key $k^7$ within the grooves will therefore in addition to the described movements have turned the countermarking disks $l^5$ by means of the square part of the axle $l^3$, and its numeral II (Fig. 11) will present itself on the left of the dating plates which numeral, as will be seen, will be stamped as well on the tickets as on the record stubs left in the apparatus. As soon as the key has been wholly pushed into the apparatus, this apparatus is ready for stamping the tickets. To this end, the operator sticks the ticket with one end into the opening $c^6$ (Fig. 5) pushing it sufficiently hard to have its fore end abut against the middle part of the buffer $o^2$ and removes the end of its from the notch $o^{10}$ of the rod $i^5$ of the slide $i$. When this is done, the operator will be enabled, by pushing against the part $c^1$ of the shank with the back of the same hand holding the ticket to bring said shank into a vertical position, as shown with dotted lines in Fig. 2. By this swinging movement of the shank around its axis $d$ the slide $i$ bearing with its lower end on the stationary nose $b^1$ will be displaced on the middle part of the shank and its upper end coming under the ticket will press the end of the ticket within the apparatus against the dating plates and countermarking disk which will therefore be stamped twice on this end of the ticket. The slide $i$ sliding upward takes the shears $h^2$ along with it, and these shears guided by the guides $p^1$ will cut off the ticket at the part between the two stamp marks hereinbefore mentioned. After this cutting the stub of the ticket will then be seized by the teeth of the half disks $n^7$, $n^8$ of the extractor, the pawl $n^9$ of which is in position to extend through the notch $n^{10}$ of the rod $i^5$ of the slide. This notch having arrived opposite the pawl and the latter moving through the notch under the effect of springs $o^{11}$ will impart a quick impulse to said half disks $n^7$ and $n^8$ so that the cut off stub is thrown into the channel $c^7$ through which it will drop into the pigeon hole 2 of the carriage. By assuming the vertical position the bent off arm $c^{18}$ of the shank presses on the wing $s^9$ of the winged rod $s^4$ (which has been displaced by the finger $r^{10}$ when introducing the key into the head of the apparatus) and one of its fingers $s^6$ for instance, will move the counter No. 2 (not shown) thus registering the stamping of this first ticket. After the cutting off of the stub and the registering, the operator stops pressing against the shank, which will be brought back by the springs $c^5$, into its initial position and the slide $i$, buffer $o^2$, the pawl of the extractor and the shears will at once also assume their original positions, ready to be operated again for a second ticket which will be registered by the winged bar on the same counter. All tickets stamped by the same operator, possessing key No. 2, will therefore be provided with a counter mark II together with the date of their stamping and will leave within the pigeon hole 2 of the carriage $r$ a stub serving to check up the number of tickets dated and delivered by this operator, the price of the ticket having been printed thereon before-hand, and the same number of tickets will have been indicated by the counter No. 2.

When his stamping service is completed for a given time the first operator withdraws the key from the head of the apparatus and during this movement of withdrawing the key all the operations described will be repeated again but in the inverse order. The carriage $r$ will be brought back into its starting position by the driving lever following the impulses transmitted to it by the finger $r^7$ which will be turned back into its starting position by the rack $f$ moved by the bosses of the countermarking disk which is operated by the axle $l^8$, which axle again is operated due to the sliding movement of the key within the helical groove $l^4$, whereby the rod $g$ with its roller will act on the heart plate $l^{10}$ as pusher or as return spring, the key, when completing its movement, having been stuck into one of the four holes of said plate. The withdrawing of the key will also return all the various parts of the head to their starting positions, said parts being thus always ready for operating as soon as one of the keys 1 to 4 is introduced into the apparatus. The key 1, when introduced into the apparatus, will, when at the end of its movement, bring countermark No. 1 back to the left of the dating plates, will bring pigeon hole 1 of the carriage above the channel $c^7$ and the wing $s^5$ of the winged rod $s^4$ into engagement with counter No. 1. Likewise the keys 3 or 4 will bring back countermarks 3 or 4 to the left of the dating plates, pigeonholes 3 or 4 of the carriage $r$ above the channel and wings $s^7$ or $s^8$ of the winged rod into engagement with the counters 3 or 4. The profile of the projections of the different keys, the helical grooves, the relation between the movements of the rack, of the carriage, of the counters, the countermarking disk and of the shears permit of all desired combinations and render any fraudulent operation extremely difficult.

The apparatus may be constructed for any number of keys and while constructed for four keys, as illustrated, it may also be arranged so as to be operated only with one key. The outside shape of the apparatus and of its parts may be altered so as to be different from those shown without departing from the character of the invention.

We claim as our invention:

1. In a machine for stamping tickets and the like, and identifying the operator of the apparatus, a casing, devices for stamping a ticket with duplicate marks, means for stamping the ticket with duplicate identification marks, devices operated by the insertion of a key for setting the aforesaid means for stamping the identification marks in such a manner as to correspond to the key inserted, a carriage, means operated by the insertion of the key for actuating the carriage and setting the same in position corresponding to the key inserted, and means for actuating the stamping devices and simultaneously cutting the ticket in parts so as to deposit one part of the ticket in a pocket in the carriage corresponding to the key inserted.

2. In a machine for stamping tickets and the like, and identifying the operator of the apparatus, a casing, devices for stamping a ticket with duplicate marks, means for stamping the ticket with duplicate identification marks, devices operated by the insertion of a key for setting the aforesaid means for stamping the identification marks in such a manner as to correspond to the key inserted, a carriage, means operated by the insertion of the key for actuating the carriage and setting the same in position corresponding to the key inserted, means for actuating the stamping devices and simultaneously cutting the ticket in parts so as to deposit one part of the ticket in a pocket in the carriage corresponding to the key inserted, and means for registering the number of tickets so printed.

3. In a machine for time stamping tickets and the like, and identifying the operator of the apparatus, a casing, devices for stamping a ticket with duplicate date marks, means for stamping the ticket with duplicate identification marks to indicate the operator of the apparatus, devices operated by the insertion of a key for setting the said means to stamp the identification marks corresponding to the key inserted, a carriage having a plurality of coupon receptacles therein, means also operated by the insertion of the key for actuating the carriage and setting the same in position so that the coupon receptacle therein corresponding to the key employed, shall be placed in a predetermined position, and means for actuating the stamping devices and simultaneously cutting the ticket in parts so that one part may be withdrawn from the machine and the other part deposited in the coupon pocket in the carriage corresponding to the key inserted.

4. In a machine for time stamping tickets and the like and identifying the operator of the apparatus, a casing, devices for stamping the ticket with duplicate date marks, means for stamping a ticket with duplicate identification marks to indicate the operator of the apparatus, devices operated by the insertion of a key for setting the said means to stamp the identification marks coresponding to the key inserted, a carriage having a plurality of coupon receptacles therein, means also operated by the insertion of a key for actuating the carriage and setting the same in position so that the coupon receptacle therein corresponding to the key employed, shall be placed in a predetermined position, means for actuating the stamping devices and simultaneously cutting the tickets in parts so that one part may be withdrawn from the machine and the other part deposited in the coupon pocket in the carriage corresponding to the key inserted, and means for registering the number of tickets so printed.

5. In a machine for time stamping tickets and the like and identifying the operator of the apparatus, a casing, devices for stamping a ticket with duplicate date marks, means for stamping the ticket with duplicate identification marks to indicate the operator of the apparatus, devices operated by the insertion of a key for setting the said means to stamp the identification marks corresponding to the key inserted, a carriage having a plurality of coupon receptacles therein, means also operated by the insertion of a key for actuating the carriage and setting the same in position so that the coupon receptacle therein corresponding to the key employed, shall be placed in a predetermined position, means for actuating the said stamping devices, means for simultaneously cutting the ticket in parts, a chute leading to the coupon pockets in the carriage, and a gripper device for engaging one portion of the cut ticket and depositing the same in the said chute, whereby one part of the ticket is delivered to the coupon pocket corresponding to the key inserted in the apparatus.

6. In a machine for time stamping tickets and the like and identifying the operator of the apparatus, a casing, devices for stamping a ticket with duplicate date marks, means for stamping the ticket with duplicate identification marks to indicate the operator of the apparatus, devices operated by the insertion of a key for setting the said means to stamp the identification marks corresponding to the key inserted, a carriage having a plurality of coupon receptacles therein, means also operated by the insertion of a key for actuating the carriage and setting the same in position so that the coupon receptacle therein corresponding to the key employed, shall be placed in a predetermined position, means for actuating the said stamping devices, means for simultaneously cutting the ticket in parts, a chute leading to the coupon pockets in the carriage, a gripper device for engaging one portion of the cut ticket and depositing the same in the said chute, whereby one part of the ticket is delivered in the coupon pocket corresponding to the key inserted in the apparatus, and means for registering the number of tickets so printed.

7. In a machine for time stamping tickets and the like, and identifying the operator of the apparatus, a casing, devices for printing a ticket with duplicate date marks, means for printing the ticket with duplicate identification marks for identifying the operator, devices operated by the insertion of any one of a plurality of keys for setting said means to print the identification marks corresponding to the key inserted, a carriage, means operated by the insertion of a predetermined key for actuating the carriage and setting the same in a position corresponding to the key inserted, means for actuating the said stamping devices, and means for simultaneously cutting the ticket in parts so that one part may be withdrawn from the apparatus and the other part deposited in a pocket in the carriage corresponding to the key inserted.

8. In a machine for time stamping tickets and the like and identifying the operator of the apparatus, a casing, devices for printing a ticket with duplicate date marks, means for printing the ticket with duplicate identification marks for identifying the operator, devices operated by the insertion of any one of a plurality of keys for setting said means to print the identification marks corresponding to the key inserted, a carriage having a plurality of coupon pockets corresponding in number with the number of keys by which the apparatus may be operated, means operated by a predetermined key for actuating the carriage to set the same in such a position that the coupon pocket corresponding to the key inserted is moved to a predetermined place in the apparatus, means for actuating the stamping devices, and means for simultaneously cutting the ticket in parts so that one part may be withdrawn from the machine and the other part deposited in the coupon pocket in the carriage corresponding to the key inserted.

9. In a machine for time stamping tickets and the like and identifying the operator of the apparatus, a casing, devices for printing a ticket with duplicate date marks, means for printing the ticket with duplicate identification marks for identifying the operator, devices operated by the insertion of any one of a plurality of keys for setting said means to print the identification marks corresponding to the key inserted, a carriage having a plurality of coupon pockets corresponding in number with the number of keys by which the apparatus may be operated, means operated by a predetermined key for actuating the carriage to set the same in such a position that the coupon pocket corresponding to the key inserted is moved to a predetermined place in the apparatus, a chute for conveying parts of tickets to any one of the said coupon pockets in the carriage, means for actuating said printing devices, means for simultaneously cutting a ticket in parts and a gripper device for seizing and conveying one part of the said ticket to the said chute so that it may be delivered thereby to the coupon pocket corresponding to the key inserted.

10. In a machine for time stamping tickets and the like and identifying the operator of the apparatus, a casing, devices for printing a ticket with duplicate date marks, means for printing the ticket with duplicate identification marks for identifying the operator, devices operated by the insertion of any one of a plurality of keys for setting said means to print the identification marks corresponding to the key inserted, a carriage having a plurality of coupon pockets corresponding in number with the number of keys by which the apparatus may be operated, means operated by a predetermined key for actuating the carriage to set the same in such a position that the coupon pocket corresponding to the key inserted is moved to a predetermined place in the apparatus, a chute for conveying parts of tickets to any one of the said coupon pockets in the carriage, means for actuating said printing devices, means for simultaneously cutting a ticket in parts, a gripper device for seizing and conveying one part of the said ticket to the said chute so that it may be delivered thereby to the coupon pocket, corresponding to the key inserted, and means for registering the number of tickets so printed.

11. In a machine for time stamping tickets and the like and identifying the operator of the apparatus, a casing, a pedestal upon which the casing is mounted, devices for stamping a ticket with duplicate marks, means for stamping the ticket with duplicate identification marks, devices operated by the insertion of a key for setting the means to stamp the tickets with the duplicate identification marks corresponding to the key inserted, a carriage having a plurality of coupon pockets therein, means for locking the carriage in position, a door connected to the pedestal, means operated by closing the said door to unlock the said carriage, means operated by the insertion of a key for setting the carriage to receive a part of the ticket in one of the pockets in the carriage, and means for actuating the stamping devices and simultaneously cutting a ticket in parts so that one part may be withdrawn from the machine and the other part deposited in the pocket in the carriage corresponding to the key inserted.

In testimony whereof we have affixed our signatures in presence of two witnesses.

JOHN PAHUD.
JACQUES HUGUENIN.

Witnesses:
 ROD. W. WORTEMBERG,
 S. EDELMAN.